United States Patent [19]
Van Berkum et al.

[11] Patent Number: 6,028,925
[45] Date of Patent: *Feb. 22, 2000

[54] TELEPHONIC SWITCHING SYSTEM, TELEPHONIC SWITCH AND METHOD FOR SERVICING TELEPHONE CALLS USING VIRTUAL MEMORY SPACES

[75] Inventors: Paul E. Van Berkum, Winfield; Doug Gisby, Lincolnshire, both of Ill.

[73] Assignee: Rockwell International Corp., Milwaukee, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/717,559

[22] Filed: Sep. 23, 1996

[51] Int. Cl.[7] .......................... H04M 11/00; H04M 3/42; H04M 3/00

[52] U.S. Cl. ...................... 379/265; 379/91.01; 379/210; 379/273; 379/309

[58] Field of Search ................................. 379/67, 88, 89, 379/67.1, 88.01, 258, 260, 261, 262, 263, 264, 265, 266, 267, 91.01, 92.01, 93.12, 210, 221, 273, 309

[56] References Cited

U.S. PATENT DOCUMENTS

| | | |
|---|---|---|
| 4,757,525 | 7/1988 | Matthews et al. ........................ 379/89 |
| 5,040,208 | 8/1991 | Jolissaint ................................. 379/209 |
| 5,181,236 | 1/1993 | LaVallee et al. .......................... 379/67 |
| 5,283,818 | 2/1994 | Klausner et al. .......................... 379/67 |
| 5,311,583 | 5/1994 | Friedes et al. .......................... 379/209 |
| 5,384,841 | 1/1995 | Adams et al. .......................... 379/266 |
| 5,400,393 | 3/1995 | Knuth et al. .............................. 379/88 |
| 5,469,504 | 11/1995 | Blaha ...................................... 379/265 |
| 5,483,578 | 1/1996 | Ackermann et al. ..................... 379/67 |

*Primary Examiner*—Fan S. Tsang
*Assistant Examiner*—Allan Hoosain
*Attorney, Agent, or Firm*—Welsh & Katz, Ltd.

[57] ABSTRACT

A telephonic switching system 100 including a telephonic switch 102 services telephone calls received from telephonic units 104 through a telephonic network 106. The telephone calls are received at input ports 107 and placed in virtual memory spaces 118 by the telephonic switch 102. There is one virtual memory space 118 for each input port 107, or voice channel, in the telephonic switch 102 such that all telephone calls received by the switch 102 are placed in a different virtual memory space. Virtual agents 119 service the telephone calls in the virtual memory spaces 118. Each virtual agent 119 is associated with one of the virtual memory spaces 118. The virtual agents 119 may connect the telephone calls to any of a number of resources. Exemplary resources include a voice response unit 108, local agent units 110 and/or remote agent units 112.

15 Claims, 2 Drawing Sheets

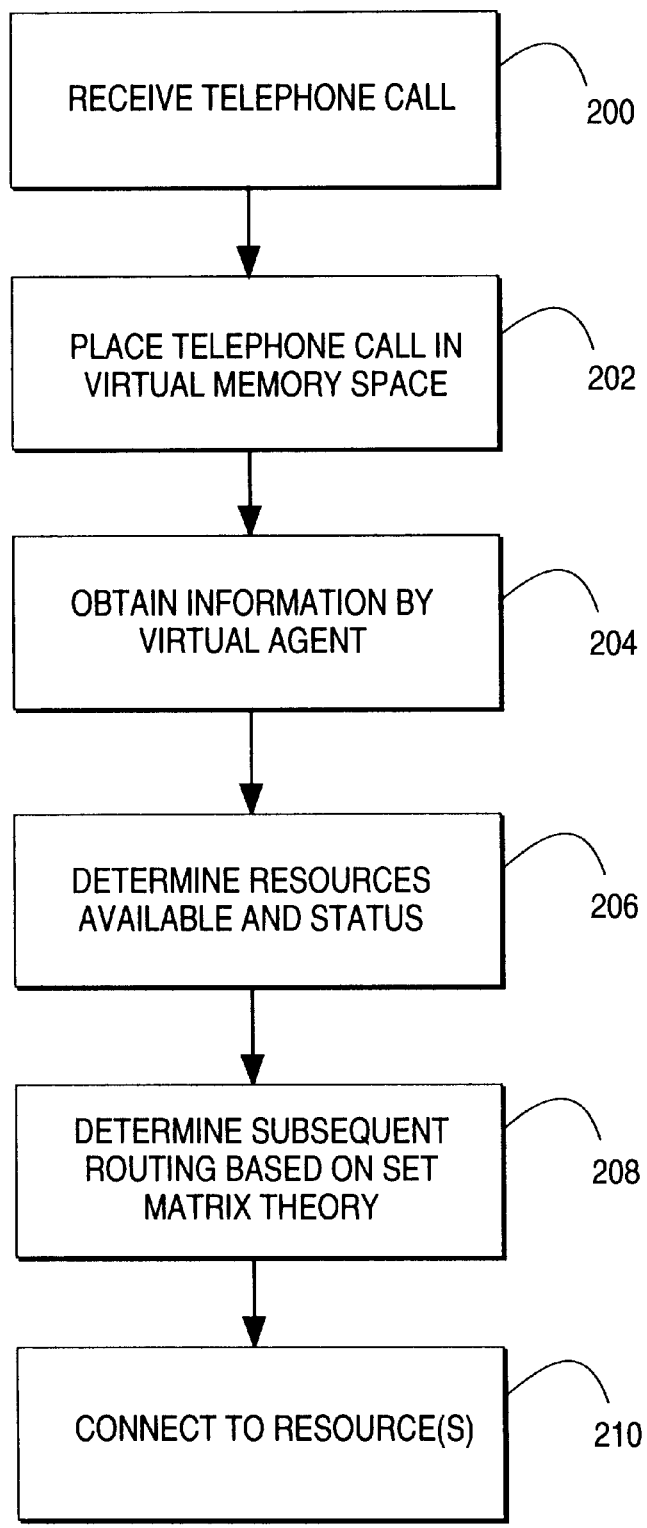

TELEPHONIC SWITCHING SYSTEM, TELEPHONIC SWITCH AND METHOD FOR SERVICING TELEPHONE CALLS USING VIRTUAL MEMORY SPACES

BACKGROUND OF THE INVENTION

The present invention relates generally to telephonic switching systems for servicing telephone calls and, more particularly, to a telephonic switching system, telephonic switch and method for servicing telephone calls wherein the telephone calls are placed in virtual memory spaces and serviced by virtual agents associated with the virtual memory spaces.

Telephonic switching systems incorporating telephonic switches are increasingly being used by businesses to automatically service customer telephone calls. One common type of telephonic switch is an automatic call distributor (ACD) which generally includes a multiport switch controlled by a central processing unit to interconnect customers and agents. An example of one such ACD is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

Various resources in the telephonic switching system may service the telephone calls. Voice response units (VRU), message recorders and, of course, human agents are just some of the resources which service the telephone calls. Since these resources are necessarily limited in number, the system is oftentimes unable to service all of the received telephone calls. In prior systems, the excess telephone calls were placed in queue awaiting the proper resource.

Unfortunately, placing the telephone calls in queue has significant drawbacks. A telephone call in queue is considered by the ACD as being "unanswered" and, therefore, the call processing functions available are limited. For example, an "unanswered" telephone call may not be transferred. In addition, dynamic announcements may not be played to the telephone call in queue. Further, real time displays relating to the telephone call are available only for "answered" telephone calls.

Accordingly, there is a need in the art for a telephonic switching system, telephonic switch and method for servicing telephone calls wherein telephone calls are placed in virtual memory spaces, wherein the telephone calls are serviced by virtual agents in the virual memory spaces, wherein each telephone call is considered answered when placed in a virtual memory space, wherein a virtual memory space is provided for each telephone call receivable by the telephonic switch, and wherein a virtual agent is provided for each virtual memory space.

SUMMARY OF THE INVENTION

This need is met by the telephonic switching system, telephonic switch and method in accordance with the present invention wherein telephone calls are placed in virtual memory spaces upon receipt, wherein the telephone calls are serviced by virtual agents in the virtual memory spaces and wherein the number of telephone calls that the telephonic switch can receive at any one time is equal to the number of virtual memory spaces such that each telephone call is considered answered when received.

In accordance with one aspect of the present invention, a telephonic switching system includes a telephonic switch having a virtual memory space in which a telephone call is placed. A virtual agent then services the telephone call from the virtual memory space. The virtual agent may select one or more resources, such as an agent unit operated by a human agent or a voice response unit for electronically servicing the call, to service the telephone call. The agent unit may be a local agent unit connected directly to the telephonic switch or a remote agent unit connected to the telephonic switch through the Internet, a telephone network and/or a computer network.

In accordance with another aspect of the present invention, a telephonic switch services telephone calls by placing the telephone calls in a plurality of virtual memory spaces. A plurality of virtual agents service the telephone calls from the virtual memory spaces. Each of the virtual agents is preferably associated with one of the virtual memory spaces. Thus, a virtual agent may only service telephone calls placed in its associated virtual memory space.

In accordance with yet another aspect of the present invention, a method for servicing telephone calls comprises the steps of: providing a plurality of virtual memory spaces, the virtual memory spaces having at least one virtual agent associated therewith; receiving the telephone call; placing the telephone call in one of the virtual memory spaces; and servicing the telephone call from the one of the virtual memory spaces by the at least one virtual agent. Preferably, the step of servicing the telephone call comprises the step of obtaining information by the at least one virtual agent from the caller while the telephone call is in the one of the virtual memory spaces.

The step of servicing may further comprise the steps of selecting one of a plurality of resources by the at least one virtual agent to service the telephone call and connecting the telephone call to the selected one of the resources. The step of selecting may comprise the step of using set matrix theory to select the one of the resources to service the telephone call. In order to maximum the call processing functionality, the method may comprise the step of indicating that the telephone call is answered when the telephone call is placed in the one of the virtual memory spaces. The step of placing preferably comprises the step of providing one of the virtual memory spaces for each incoming telephone line connected to the telephonic switch.

These and other features and advantages of the present invention will become apparent from the following detailed description, the accompanying drawings and the appended claims.

BRIEF DESCRIPTION OF THE DRAWINGS

FIG. 2 is a flow chart presenting an exemplary operating procedure for the telephonic switching system shown in FIG. 1 in accordance with the present invention.

DETAILED DESCRIPTION OF THE INVENTION

Figure 1:
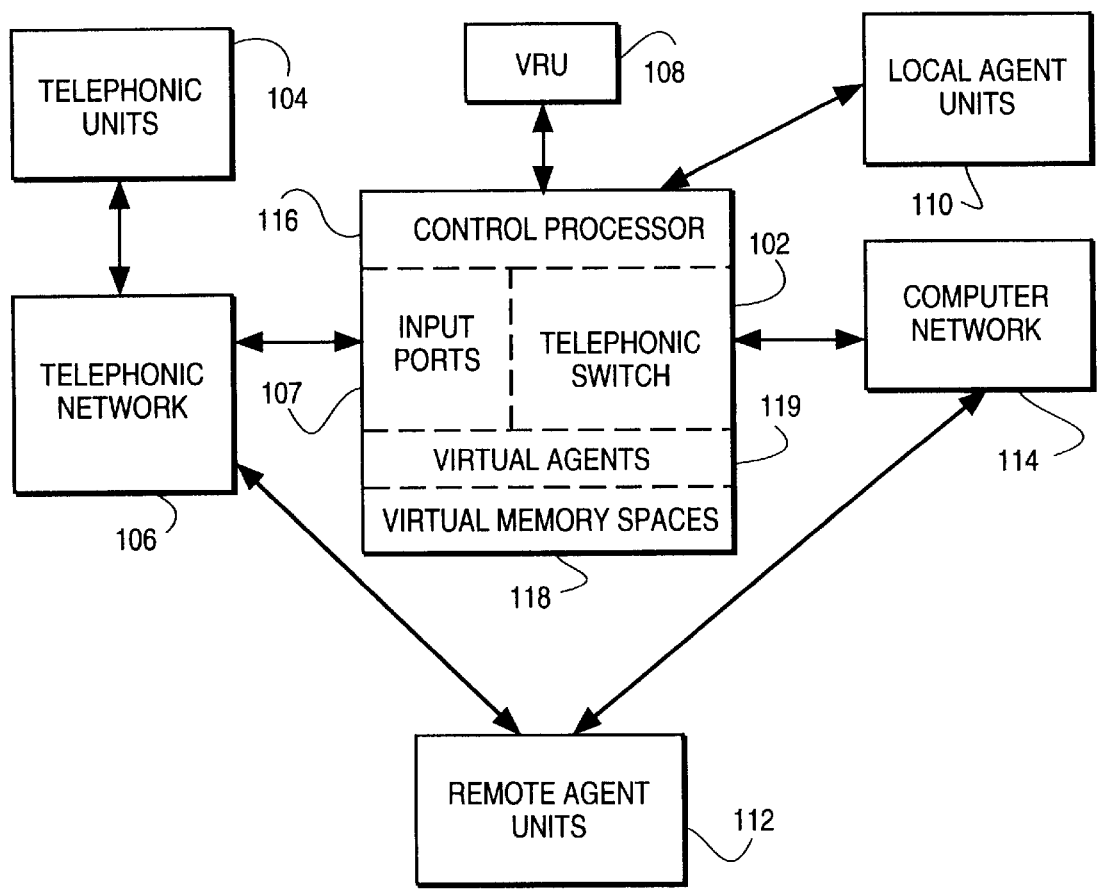
FIG. 1 is a schematic block diagram of a telephonic switching system in accordance with the present invention.

A telephonic switching system 100 in accordance with the present invention is shown in FIG. 1 in schematic block diagram form. A telephonic switch 102, such as an automatic call distributor, services telephone calls received from telephonic units 104 through a telephonic network 106. The telephone calls may be received over an integrated services digital network (ISDN). The telephone calls may also be received over a T1 link or an E1 link. The telephonic switch 102 has a number of input ports 107 for receiving the telephone calls. As is well known in the art, the number of input ports 107 determines how many telephone calls may be received by the switch 102 at any one time. The system 100 of the present invention may be implemented with a number of types of telephonic switches, such as an automatic call distributor of the type shown in U.S. Pat. No. 5,268,903 issued to Jones et al. on Dec. 7, 1993 entitled "Multichannel Telephonic Switching Network With Different Signaling Formats and Connect/PBX Treatment Selectable For Each Channel"; U.S. Pat. No. 4,627,047 to Pitroda et al., entitled "Integrated Voice and Data Telecommunications Switching System", issued Dec. 2, 1986; U.S. Pat. No. 5,469,504 to Blaha, entitled "Automatic Call Distributor With Intersubnetwork Customer Information Transfer System and Method", issued Nov. 21, 1995; and U.S. Pat. No. 5,384,841 to Adams et al., entitled "Automatic Call Distribution Network With Call Overload System and Method", issued Jan. 24, 1995, the disclosures of which are hereby incorporated by reference.

The system 100 services the telephone calls in any of a number of manners. For example, digital network integrated services (DNIS) information or automatic number identification (ANI) information may be received with the telephone call. In addition, a voice response unit (VRU) 108 may audibly prompt the caller for information. This information may be used to route the telephone calls to human agents located at local agent units 110 or remote agent units 112. The local and remote agent units 110 and 112 are typically comprised of an agent terminal and a telephone console to provide visual and audio communications with the agent. The telephonic switch 102 typically communicates with the remote agent units 112 through the telephonic network 106 or a computer network 114.

In the telephonic switch 102, a control processor 116 executes various software programs to service the telephone calls. As those skilled in the art will readily understand, the control processor 116 is representative of a number of electronic components, such as memory chips, logic devices, and the like. In accordance with the present invention, the control processor 116 routes the telephone calls to virtual memory spaces 118 upon receipt of the calls.

FIG. 2 shows a step by step exemplary representation of the servicing of a telephone call in accordance with the present invention. The telephone call is received by the telephonic switch 102 at step 200. The control processor 116 detects the receipt of the telephone call and places the telephone call in a designated space in the virtual memory spaces 118 at step 202. In a preferred version of the present invention, one space is provided in the virtual memory spaces 118 for each voice channel (or input port 107) in the telephonic switch 102 which receives the telephone calls from the telephonic network 106. Thus, every telephone call received at the switch 102 is immediately placed in a unique virtual space and is considered "answered". As those skilled in the art will readily comprehend, the virtual memory spaces 118 may be contained in any of a number of electronic memory devices.

Software-based virtual agents 119 service the telephone calls in the virtual memory spaces 118. One of the virtual agents 119 is preferably assigned to each virtual memory space. "Virtual agent" will be used herein for any call processing software which services telephone calls. The present invention advantageously provides for a virtual agent (or call processing software) for each voice channel, or input port 107, of the telephonic switch 102 receiving telephone calls from the telephonic network 106. Each virtual agent services telephone calls placed in the agent's assigned space. Having a virtual agent handle each voice channel provides a flexibility in call processing unavailable in prior telephonic switching systems.

When the virtual agent acquires the telephone call, the telephonic switch. 102 considers the telephone call "answered". Thereafter, numerous functions may be performed on the telephone call which could not be performed with the telephone call in queue, as in prior systems. For example, while the telephone call is in one of the virtual memory spaces 118, announcements may be automatically played by the virtual agent at any given time. Further, the telephone call may be transferred and real time displays of the telephone call can be produced.

While the telephone call is in one of the virtual memory spaces 118, the virtual agent may gather additional information relating to the telephone call at step 204. Based on this additional information, the virtual agent may decide that other resources are required to service the telephone call. The virtual agent determines what resources are available and the status of each of these resources at step 206. Advantageously, the virtual agent may look at individual resources, or sets of resources, and real time events when determining subsequent routing of the call. In making such a determination, the virtual agent considers all resources (both local and distributed telephony resources) equally. In step 208, the virtual agent selects a resource to route the telephone call based on set matrix theory. The telephone call is then connected, at step 210, to the selected resource, such as the VRU 108 or human agent located at the local agent units 110 or the remote agent units 112.

The structure, control and arrangement of the conventional components and circuits have, for the most part, been illustrated in the drawings by readily understandable block representations and schematic diagrams. The drawings show only those specific details pertinent to the present invention, in order not to obscure the disclosure with structural details which will be readily apparent to those skilled in the art having the benefit of the description herein.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A method for servicing a telephone call from a caller comprising the steps of:

provide a plurality of virtual memory spaces, the virtual memory spaces having a different virtual agent assigned to each memory space;

receiving the telephone call on a voice channel of a plurality of voice channels associated with the virtual memory spaces;

placing the telephone call in one of the virtual memory spaces; and servicing the telephone call through the voice channel from the one of the virtual memory spaces by the assigned virtual agent.

2. The method as recited in claim 1 wherein the step of servicing the telephone call comprises the step of:

obtaining information by the at least one virtual agent from the caller while the telephone call is in the one of the virtual memory spaces.

3. The method as recited in claim 1 wherein the step of servicing comprises the steps of:

selecting one of a plurality of resources by the at least one virtual agent to service the telephone call; and connecting the telephone call to the selected one of the resources.

4. The method as recited in claim 3 wherein the step of selecting comprises:

using set matrix theory to select the one of the resources to service the telephone call.

5. The method as recited in claim 3 wherein the step of selecting comprises the step of:

selecting a voice response unit to service the telephone call.

6. The method as recited in claim 3 wherein the step of selecting comprises the step of:

selecting a human agent to service the telephone call.

7. The method as recited in claim 1 comprising the step of:

indicating that the telephone call is answered when the telephone call is placed in the one of the virtual memory spaces.

8. The method as recited in claim 1 wherein the step of placing comprises the step of:

providing one of the virtual memory spaces for each incoming telephone line connected to the telephonic switch.

9. A telephonic switching system for servicing a telephone call received on a voice channel of a plurality of voice channels, such switching system comprising:

a plurality of virtual memory spaces associated with the plurality of voice channels, said plurality of virtual memory spaces each having an assigned different virtual agent a virtual memory space of the plurality of virtual memory spaces for placing the telephone call; and an assigned different virtual agent of the virtual memory space for servicing the telephone call through the voice channel from the virtual memory space.

10. The telephonic switching system as recited in claim 9 comprising:

at least one resource for servicing the telephone call in response to the virtual agent.

11. The telephonic switching system as recited in claim 10 wherein the at least one resource comprises:

a voice response unit for servicing the telephone call.

12. The telephonic switching system as recited in claim 10 wherein the at least one resource comprises:

an agent unit for servicing the telephone call by a human agent.

13. The telephonic switching system as recited in claim 12 wherein the agent unit comprises:

a remote agent unit for servicing the telephone call.

14. A telephonic switch for servicing telephone calls received through a plurality of voice channels comprising:

a plurality of virtual memory spaces associated with the plurality of voice channels for receiving the telephone calls; and a plurality of virtual agents for servicing the telephone calls from the virtual memory spaces through the plurality of voice channels, each of the virtual agents being associated with at least one of the virtual memory spaces.

15. The telephonic switch as recited in claim 14 comprising:

input ports for receiving the telephone calls, and wherein one of the virtual memory space is associated with a corresponding one of the input ports.

* * * * *